United States Patent
Kunimori et al.

(10) Patent No.: US 7,759,627 B2
(45) Date of Patent: Jul. 20, 2010

(54) DISPLAY DEVICE

(75) Inventors: Takashi Kunimori, Tottori (JP);
Yasushi Yamazaki, Azumino (JP);
Masanori Yasumori, Tottori (JP)

(73) Assignee: Sony Corporation, Tokyo (JP)

(*) Notice: Subject to any disclaimer, the term of this patent is extended or adjusted under 35 U.S.C. 154(b) by 331 days.

(21) Appl. No.: 12/075,062

(22) Filed: Mar. 6, 2008

(65) Prior Publication Data

US 2008/0224027 A1    Sep. 18, 2008

(30) Foreign Application Priority Data

Mar. 12, 2007    (JP) .............................. 2007-061333

(51) Int. Cl.
*H03F 3/08*    (2006.01)
(52) U.S. Cl. .................. 250/214 AL; 345/81; 345/207; 348/602
(58) Field of Classification Search ........... 250/214 AL; 345/98, 63, 76–81, 102, 207; 348/602
See application file for complete search history.

(56) References Cited

U.S. PATENT DOCUMENTS

| | | | |
|---|---|---|---|
| 7,015,890 | B2 | 3/2006 | Moon |
| 2005/0218302 | A1* | 10/2005 | Shin et al. ............... 250/214 R |
| 2006/0092112 | A1 | 5/2006 | Moon |
| 2007/0018932 | A1 | 1/2007 | Takaki et al. |
| 2007/0046619 | A1 | 3/2007 | Sano et al. |
| 2007/0262966 | A1 | 11/2007 | Nishimura et al. |

FOREIGN PATENT DOCUMENTS

| | | |
|---|---|---|
| JP | 2003-108100 | 4/2003 |
| JP | 2004-233569 | 8/2004 |
| JP | 2006-146895 | 6/2006 |
| JP | 2006-243655 | 9/2006 |
| JP | 2007-033659 | 2/2007 |
| JP | 2007-058552 | 3/2007 |

* cited by examiner

*Primary Examiner*—Georgia Y Epps
*Assistant Examiner*—Kevin Wyatt
(74) *Attorney, Agent, or Firm*—K&L Gates LLP

(57) ABSTRACT

A display device according to an embodiment of the invention includes a display panel, a drive circuit that drives the display panel, an illuminating unit that illuminates the display panel, a photosensing section Ls having an ambient light photosensor Ts that senses the brightness of ambient light and a capacitor Cw that is charged with a predetermined reference voltage via a first switch S1, an ambient light photosensor reading section Re1 that reads a value sensed by the photosensing section, and a controller that controls the illuminating unit according to an output of the ambient light photosensor reading section. The ambient light photosensor reading section is provided with a noise avoidance unit that avoids erroneous sensing in the photosensing section induced as a result of noise generated when the drive circuit operates. Thanks to such structure, a display device is provided in which sensing of ambient light is free from the effects of noise arising from the parasitic capacitance formed between the electrodes and wiring of the ambient light photosensor and the display panel.

7 Claims, 15 Drawing Sheets

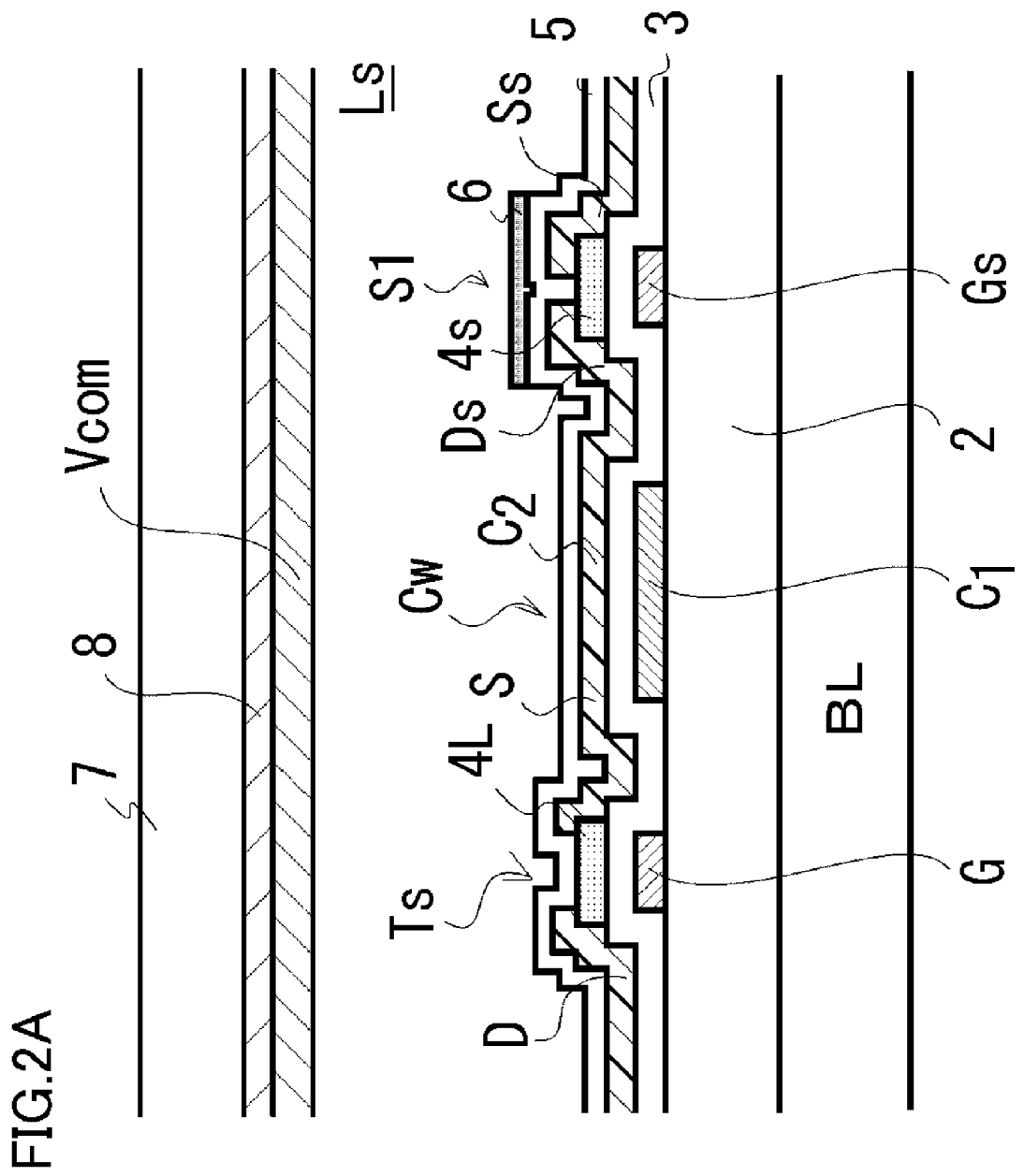

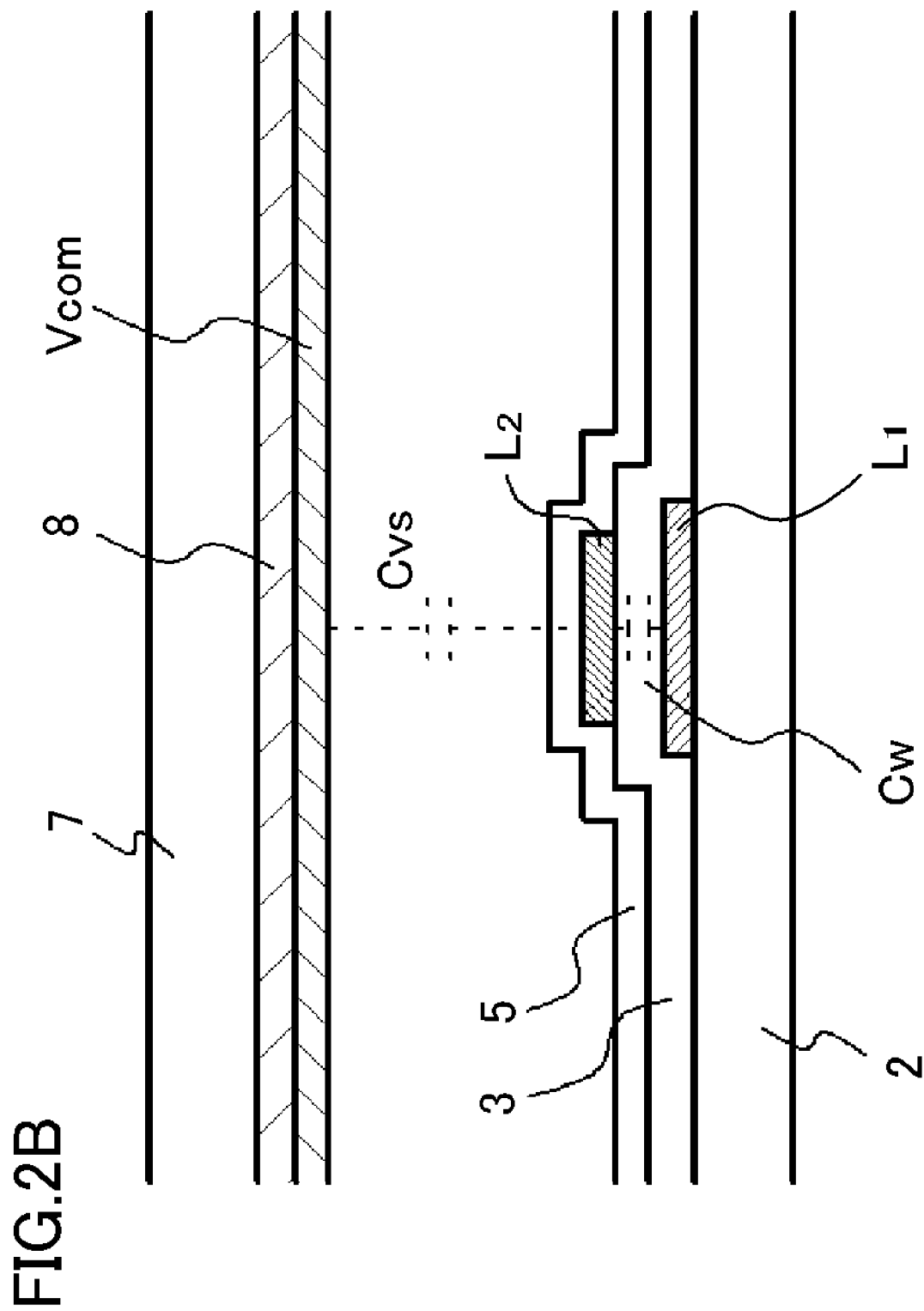

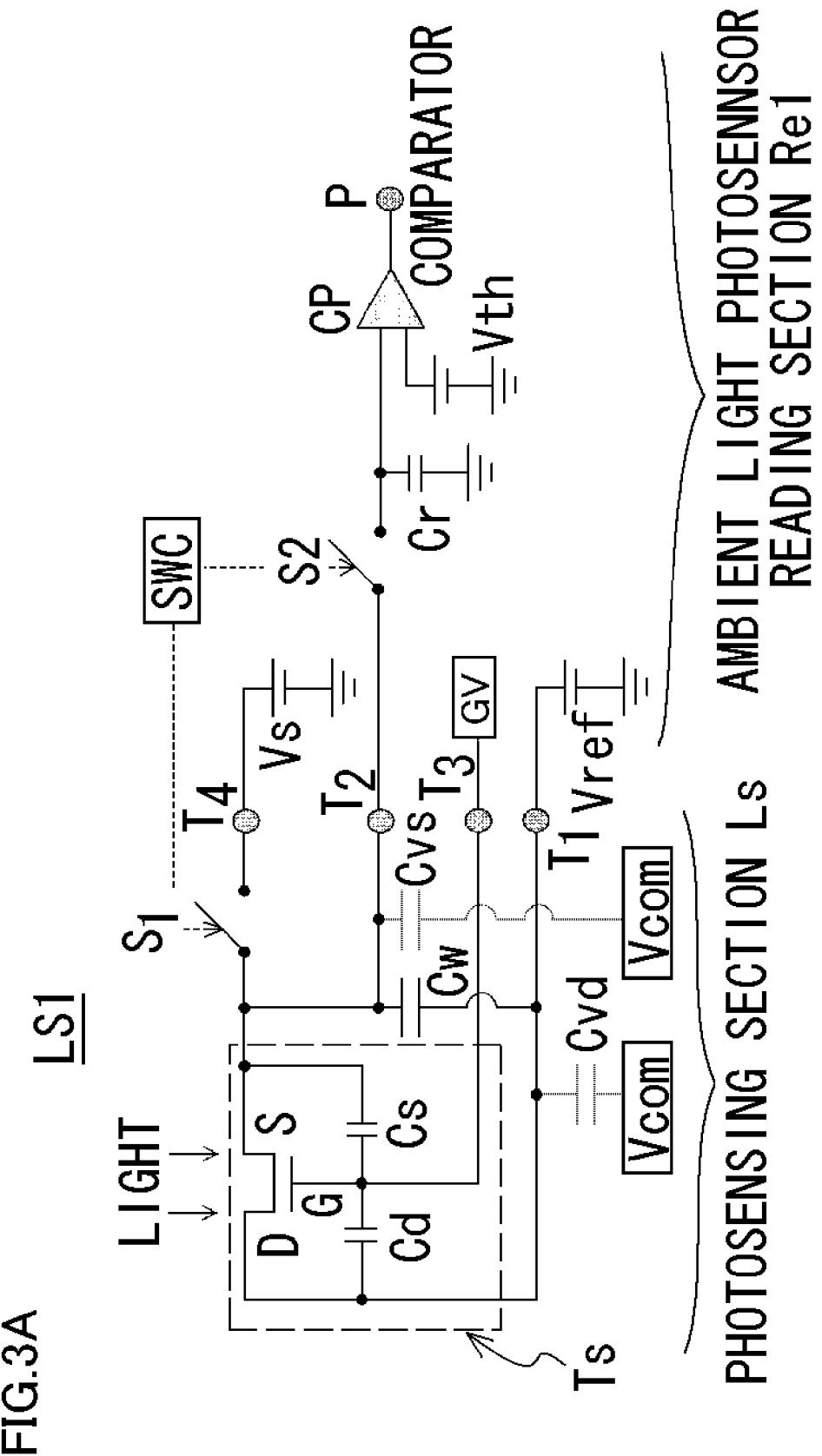

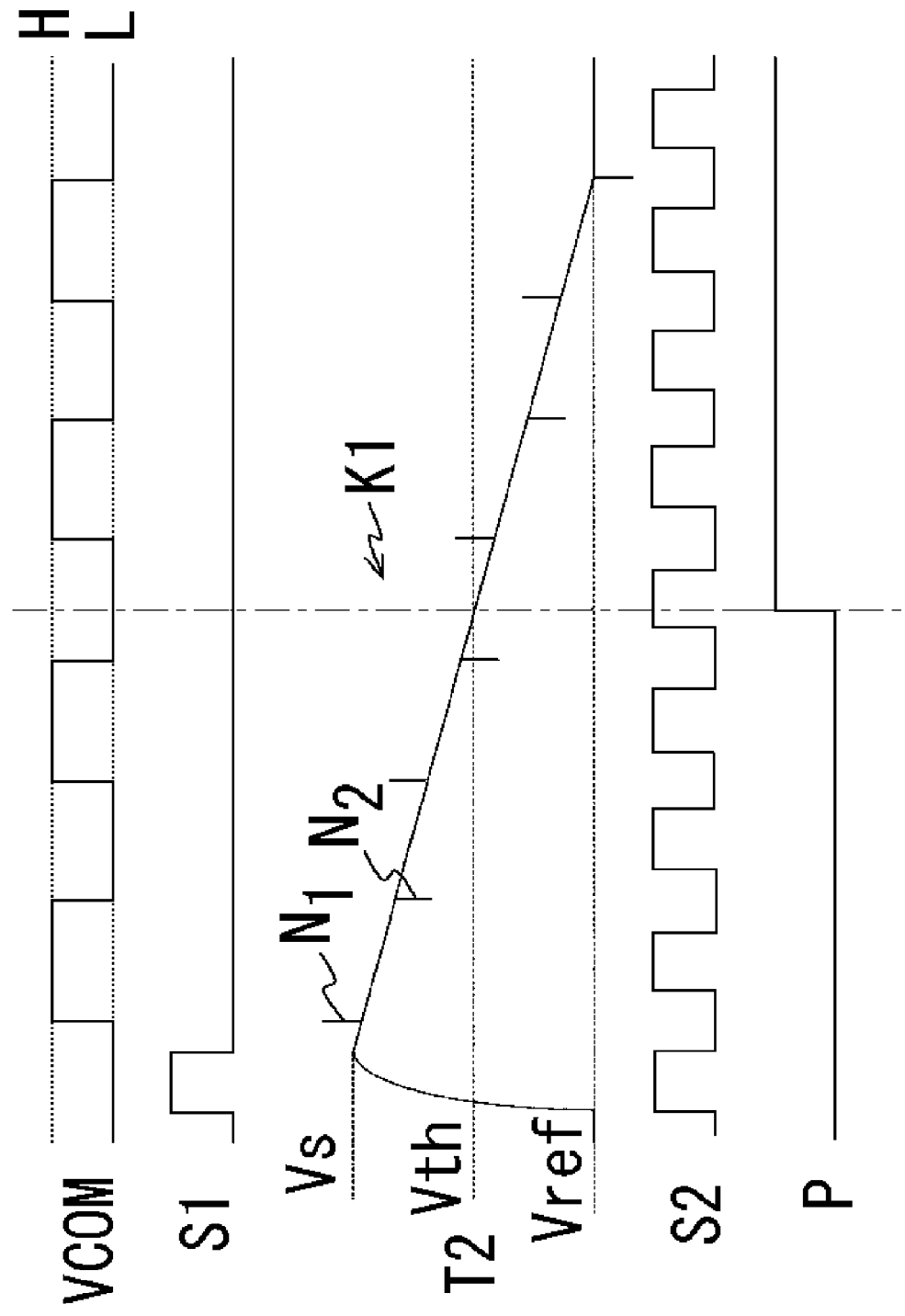

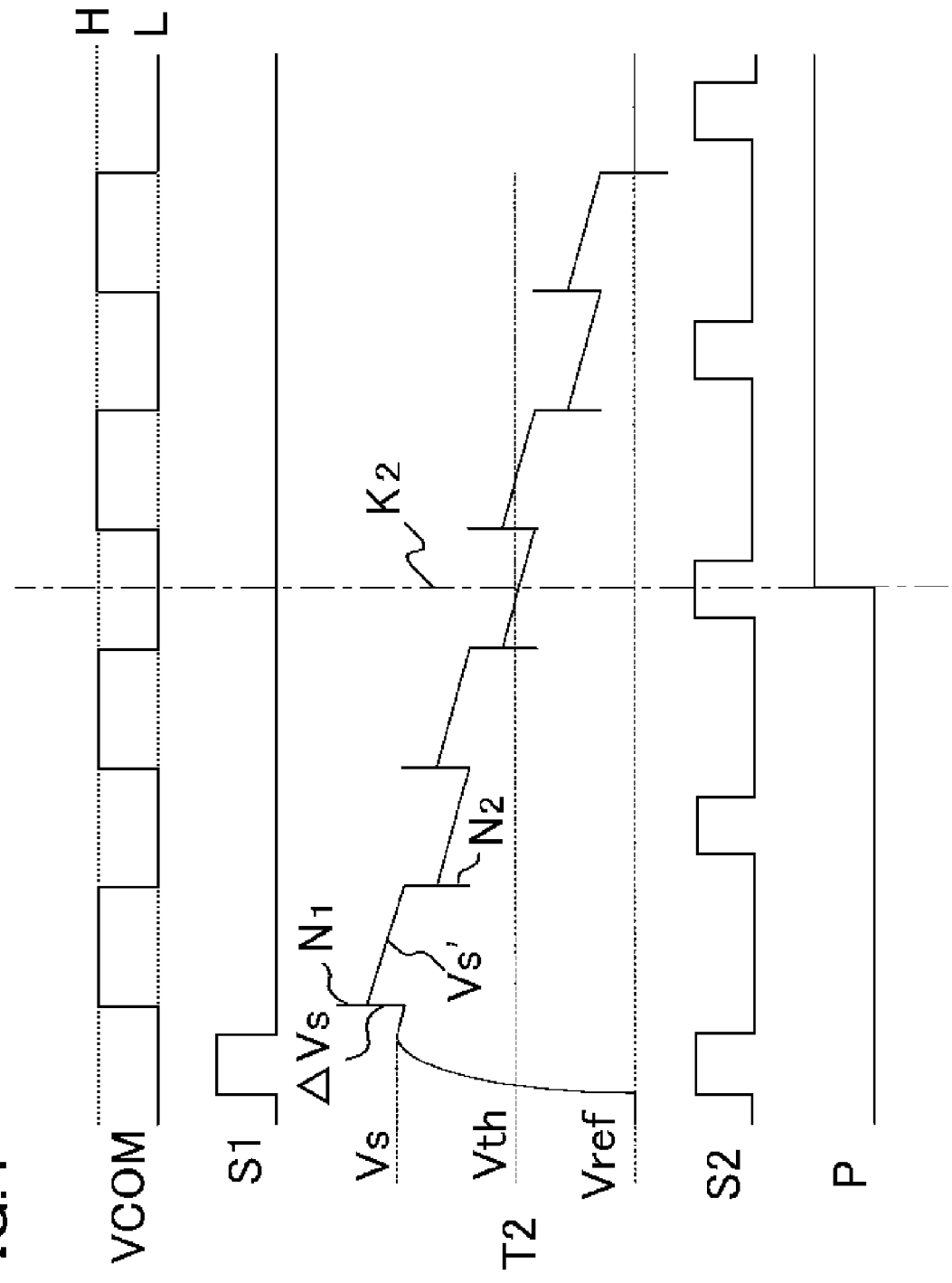

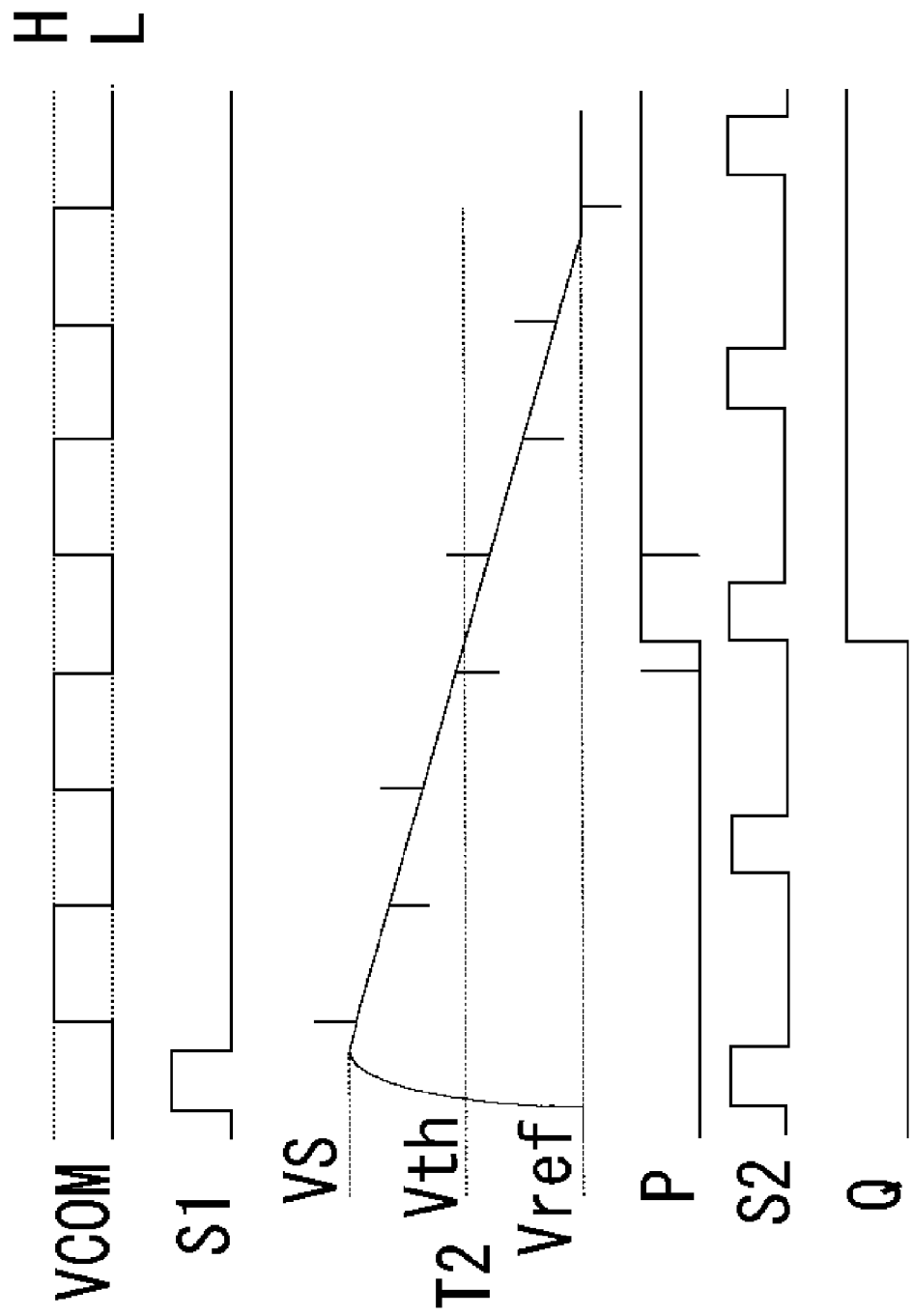

DISPLAY DEVICE

BACKGROUND

1. Technical Field

The present invention relates to a display device, more particularly to a display device in which an ambient light photosensor that senses the brightness of ambient light is incorporated into a display panel, and a light source that illuminates the display panel is controlled according to an output of such ambient light photosensor.

2. Related Art

Over recent years, flat-type display panels have come into use not only in information and telecommunications equipment but in electronic equipment generally, and liquid crystal display panels are the most widely used among such panels. Liquid crystal display panels are provided with a backlight or the like that is lighted to illuminate the display screen when the ambient light is dim. Otherwise, the displayed images would be hard to view, since liquid crystals are non light-emitting. However, manual operation of the backlight is bothersome as it means having to turn the backlight on/off frequently according to the ambient brightness. Accordingly, technology has been developed (for example, JP-A-2006-243655) whereby the liquid crystal display panel incorporates an ambient light photosensor that senses the ambient light, and the backlight is turned on/off according to the results of such sensing.

FIG. 8 illustrates a known photosensing circuit and the signal waveforms generated thereby. This photosensing circuit LS is composed of a photosensing section Ls having an ambient light photosensor and an ambient light photosensor reading section Re that reads the photosensing section's output. Also, a thin film transistor ("TFT" below) ambient light photosensor Ts with a TFT as photosensing member is used for the ambient light photosensor of the photosensing section Ls. The operation of this photosensing circuit is as follows. A reverse bias voltage GV is applied in advance to the gate electrode G of the TFT ambient light photosensor Ts. With that state, first of all a switch S1 is turned on and a capacitor Cw is charged with a predetermined reference voltage Vs. Then the switch S1 is turned off, whereupon the charge accumulated in the capacitor Cw is discharged via the TFT ambient light photosensor Ts. When light exposes the TFT ambient light photosensor Ts, leakage current flows therein, and the leakage volume varies according to the quantity of light received. Therefore, the discharge is fast when the quantity of incoming light is large, and the discharge is slow when the quantity of incoming light is small. Thus, the charged voltage of the capacitor Cw falls with time according to the brightness, as indicated by the voltage waveforms for a terminal T2 in FIG. 8B. Accordingly, the output of the photosensing section Ls, in other words the voltage of the capacitor Cw, is compared with a predetermined reference voltage Vth, and if the voltage of the capacitor Cw is at or below the reference voltage Vth, the output of a comparator CP is inverted, the brightness of the ambient light is judged by determining the inversion time of such inverted output P, and lighting of a backlight (not shown) is controlled according to such judgment results.

When the photosensing circuit is incorporated into a liquid crystal display panel (not shown), however, the fact that various semiconductor parts such as TFTs for driving the liquid crystals, as well as drive circuits for electrodes and the like that link up such parts, are already deposed in large numbers on the substrates composing the liquid crystal display panel, means that parasitic capacitances between such drive circuits and the photosensing circuit's TFT ambient light photosensor's electrodes and wiring will be formed when the liquid crystal display panel is driven. Such parasitic capacitance will appear as, for example, parasitic capacitances Cvs and Cvd formed between the source electrode S and drain electrode D on the one hand and the common electrode Vcom on the other, plus parasitic capacitances Cs and Cd between the source electrode S and drain electrode D on the one hand and the gate electrode G on the other. When such parasitic capacitances occur, with a VCOM voltage constituted of rectangular waves, as illustrated by the VCOM voltage in FIG. 8B, normally being applied to the common electrode, if this VCOM voltage changes, that is, if it steps to high level H or low level L, mustache-like short pulses $N_1$, $N_2$ will arise in the output of the ambient light photosensor Ts under the attraction of such variation. These short pulses $N_1$, $N_2$ will be superimposed on the voltage of the capacitor Cw; more precisely, the positive short pulses $N_1$ will be superimposed on the voltage of the capacitor Cw when the VCOM voltage is at the high level H, and the negative short pulses $N_2$ will be superimposed on the voltage of the capacitor Cw when the VCOM voltage is at the low level L. However, these short pulses $N_1$, $N_2$ correspond not to the sensed value for ambient brightness, but to a kind of noise. Therefore, for example, superimposition of the short pulses $N_2$ on the voltage of the capacitor Cw will cause such voltage to fall below a reference voltage Vth even though the capacitor Cw voltage value produced in response to the ambient light brightness does not reach the reference voltage Vth level. As a result, an output P of the comparator CP will be inverted, causing the backlight to be lighted erroneously, as indicated by the dot dash line $K_0$ in FIG. 8B.

SUMMARY

An advantage of some aspects of the present invention is to provide a display device in which an ambient light photosensor is incorporated into a display panel and is able to sense the brightness of ambient light without being influenced by noise generated by parasitic capacitance formed between a photosensing circuit and a drive circuit for driving the display panel.

According to a first aspect the invention, a display device includes: a display panel, a drive circuit that drives the display panel, an illuminating unit that illuminates the display panel, a photosensing section that is incorporated into the display panel and has an ambient light photosensor that senses the brightness of ambient light and a capacitor that is charged with a predetermined reference voltage via a first switch, an ambient light photosensor reading section that reads a value sensed by the photosensing section, and a controller that controls the illuminating unit according to an output of the ambient light photosensor reading section. The ambient light photosensor reading section is provided with a noise avoidance unit that avoids erroneous sensing in the photosensing section induced as a result of noise generated when the drive circuits operate.

With such aspect of the invention, the photosensing section is incorporated into the display panel, so that even if noise is induced between the photosensing section and the drive circuit and results in erroneous sensing by the photosensing unit, erroneous readings that include the noise will be avoided by the noise avoidance unit in the ambient light photosensor reading section. Accordingly, accurate ambient light photosensor output that is free of the influence of the noise and corresponds to the ambient light brightness can be read. Thus, misoperation of the illuminating unit that illuminates the display panel can be prevented.

According to a first aspect of invention, the noise avoidance unit in the display device may include a second switch that connects the photosensing section to the ambient light photosensor reading section, and a switch controller that controls the second switch, with the switch controller performing control so that the second switch is turned on when the drive circuit is generating no noise.

With such arrangement, when signals constituted of, say, rectangular waves are applied to an electrode of the display panel, although noise will be prone to be generated due to the parasitic capacitance arising between the photosensing unit and the drive circuit when the signals change, the second switch will be turned off at such times, so that the ambient light photosensor reading section will be disconnected from the photosensing unit, and thereby the effects of the noise will be avoided. Also, in structural terms the noise avoidance unit is extremely simple to form, being made up of the second switch that connects the photosensing section and the ambient light photosensor reading section, plus the switch controller that controls the second switch.

According to a first aspect of the invention, a low level signal and a high level signal may be applied alternately in a predetermined cycle to an electrode of the display panel, with the switch controller performing control so that when the low level signal is applied, the first switch is turned on and, if the capacitor is charged to the reference voltage, the second switch is turned on during application of the low level signal; and when the high level signal is applied, the first switch is turned on and, if the capacitor is charged to the reference voltage, the second switch is turned on during application of the high level signal.

With such arrangement, even if the parasitic capacitance formed at the periphery of the ambient light photosensor is markedly large in the circuit design, it will be possible to obtain accurate ambient light photosensor output readings that correspond to the ambient light brightness, without any influence from noise.

According to a second aspect of the invention, a display device includes: a display panel, a drive circuit that drives the display panel, an illuminating unit that illuminates the display panel, a photosensing section that is incorporated into the display panel and has an ambient light photosensor that senses the brightness of ambient light and a capacitor that is charged with a predetermined reference voltage via a first switch, an ambient light photosensor reading section that reads a value sensed by the photosensing section, and a controller that controls the illuminating unit according to an output of the ambient light photosensor reading section. The ambient light photosensor reading section has a first comparative circuit that compares the photosensing section's output with a predetermined reference value and outputs a predetermined digital signal, and a noise canceling circuit that receives the digital signal from the first comparative circuit and, if such digital signal varies in a time period shorter than a predetermined time period, judges such digital signal to be noise and excludes such digital signal.

With such aspect of the invention, noise can be eliminated in a simple manner, thanks to provision of the noise canceling circuit that receives the digital signal from the first comparative circuit and judges the digital signal to be noise if the signal varies in a time period shorter than a predetermined time period, in which case the signal is excluded.

According to the second aspect of the invention, the noise canceling circuit may be provided with a delaying circuit that delays by a predetermined time period the digital signal from the first comparative circuit, and with a second comparative circuit that compares the delayed digital signal from the delaying circuit with the undelayed digital signal from the first comparative circuit, and the second comparative circuit produces output when the delayed and undelayed digital signals coincide.

With such arrangement, those of the digital signals output from the first comparative circuit that are shorter than a predetermined time period are not output by the second comparative circuit, and thereby the noise components can be accurately eliminated.

According to the second aspect of the invention, the noise canceling circuit may include an enabling circuit that generates an enabling signal when the drive circuit is generating no noise, and the noise canceling circuit produces output while detecting such enabling signal.

With such arrangement, the noise canceling circuit can be formed from an extremely simple circuit.

According to a third aspect of the invention, a display device includes: a display panel, drive circuits that drive the display panel, an illuminating unit that illuminates the display panel, a photosensing section that is incorporated into the display panel and has an ambient light photosensor that senses the brightness of the ambient light and a capacitor that is charged with a particular reference voltage via a first switch, an ambient light photosensor reading section that reads a value sensed by the photosensing section, and a controller that controls the illuminating unit according to an output of the ambient light photosensor reading section. The ambient light photosensor reading section is provided with a capacitor having the same capacitance as a parasitic capacitance formed between an output wire of the photosensing section and an electrode of the display panel. A signal of opposite phase to a signal applied to the electrode is applied to the capacitor.

With such aspect of the invention, thanks to a capacitor being provided that has the same capacitance as the parasitic capacitance formed between the output wire of the photosensing section and the drive circuit, and to a signal of opposite phase to the signal applied to the electrode being applied to the capacitor, the noise arising from the parasitic capacitance is canceled out.

BRIEF DESCRIPTION OF THE DRAWINGS

The invention will be described with reference to the accompanying drawings, wherein like numbers reference like elements.

FIG. 2A is a cross-sectional structural view of a photosensing circuit, and FIG. 2B is a cross-sectional view along line IIB-IIB.

FIG. 3A is an equivalent circuit diagram of the photosensing circuit, and FIG. 3B is a waveform diagram explicating the sensor output.

FIG. 4 is an operational waveform diagram for the case where parasitic capacitance is large in the photosensing circuit of FIG. 3A.

DESCRIPTION OF EXEMPLARY EMBODIMENTS

Exemplary embodiments of the invention will now be described with reference to the accompanying drawings. It should however be understood that the following embodiments are intended by way of examples of liquid crystal display devices serving as instances of display devices that carry out the technical concepts of the invention, not by way of limiting the invention to these particular liquid crystal display devices. The invention can equally well be adapted to yield other embodiments within the scope and spirit of the claims.

First Embodiment

Figure 1:
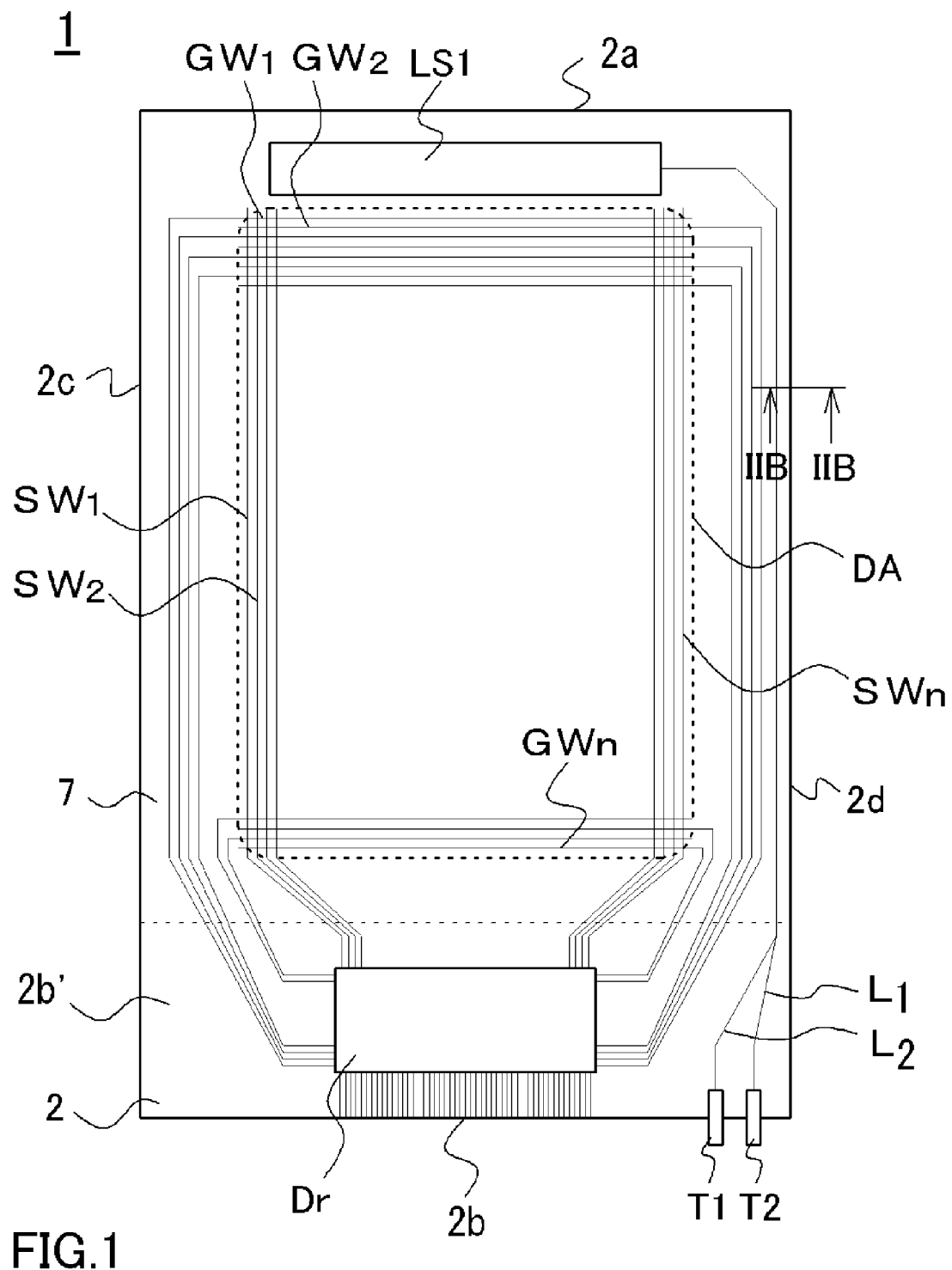
FIG. 1 is a plan view illustrating a liquid crystal display panel in a liquid crystal display device of a first embodiment of the invention.

FIG. 1 is a plan view, looking through a color filter substrate, of a TFT array substrate of a liquid crystal display device in a first embodiment of the invention. FIG. 2 illustrates the photosensing section of the liquid crystal display device in FIG. 1, FIG. 2A being a cross-sectional structural view of the photosensing section, and FIG. 2B being a cross-sectional view along line IIB-IIB in FIG. 1. FIG. 3 illustrates the photosensing circuit, FIG. 3A being an equivalent circuit diagram thereof and FIG. 3B being a waveform diagram explicating the relation between the VCOM voltage applied to the common electrode and the sensor output.

A liquid crystal display device 1 is composed of a liquid crystal display panel and a backlight BL. The liquid crystal display panel has a pair of rectangular transparent substrates, namely a TFT array substrate ("TFT substrate" below) 2 and a color filter substrate ("CF substrate" below) 7, that are disposed opposing each other and are constituted of a transparent material, for example, glass plate. The liquid crystal display panel has a structure such that the TFT substrate 2 and CF substrate 7 are bonded together via the intermediary of rim-like seal material that is interposed between the outer edges thereof, an empty space is formed in the interior therebetween, and such empty space is filled with liquid crystal. The item used for the TFT substrate 2 is larger in size than the CF substrate 7, so that when disposed opposing the CF substrate 7, an overhang portion 2b' extending a particular distance is formed. Also, various wirings and the like are formed on the opposed surfaces of the TFT substrate 2 and CF substrate 7.

On the CF substrate 7, black matrixes are provided in a matrix layout so as to match the pixel areas of the TFT substrate 2. Color filters 8 for, say, the colors red (R), green (G) and blue (B) are provided in the spaces enclosed by the black matrixes, and a common electrode 9 is provided so as to cover the color filters 8 (see FIG. 2A).

Also, on the rear surface of the TFT substrate 2 there is provided a light source that illuminates the liquid crystal display panel, namely a backlight BL, which is controlled by means of output signals from the photosensing section Ls. The TFT substrate 2 has opposed short edges 2a, 2b, and long edges 2c, 2d, with one short edge 2b constituting the overhang portion 2b', on which is mounted a semiconductor chip Dr for a source driver and gate driver.

The TFT substrate 2 has on the surface thereof, that is, on the face that contacts with the liquid crystals, a plurality of gate wires $GW_1$ to $GW_n$ (n=2, 3, 4 ... ) arrayed at a particular spacing in the direction of the rows (horizontal direction) in FIG. 1, and a plurality of source wires $SW_1$ to $SW_m$ (m=2, 3, 4 ... ) arrayed in the direction of the columns (vertical direction) and isolated from the gate wires $GW_1$ to $GW_n$. These source wires $SW_1$ to $SW_m$ and gate wires $GW_1$ to $GW_n$ are arranged to form a matrix, and in the spaces enclosed by the intercrossing gate wires $GW_1$ to $GW_n$ and source wires $SW_1$ to $SW_m$ there are formed switching elements (omitted from the drawings) which are turned on by scan signals from the gate wires $GW_1$ to $GW_n$, and pixel electrodes (omitted from the drawings) to which picture signals from the source wires $SW_1$ to $SW_m$ are supplied via the switching elements.

Each space enclosed by these gate wires $GW_1$ to $GW_n$ and source wires $SW_1$ to $SW_m$ constitutes what is known as a pixel, and the area over which the pixels are formed constitutes the display area DA, or in other words the image display section. For the switching elements, thin film transistors (TFTs) will, for example, be used. The gate wires $GW_1$ to $GW_n$ and source wires $SW_1$ to $SW_m$ extend out of the display area DA, are passed around the peripheral area external to the display area DA, and are connected to the source driver and gate driver semiconductor chip Dr. Also, the TFT substrate 2 is provided with a photosensing circuit LS1 at one short edge 2a, and on the long edge 2d thereof there are disposed lead wires (power wire $L_1$ and output wire $L_2$) that are drawn out from the photosensing section Ls. These lead wires $L_1$ and $L_2$ are connected to terminals T1 and T2. External control circuits not shown in the drawings are connected to the terminals T1 and T2.

The structures of the photosensing circuit LS1 and lead wires $L_1$ and $L_2$ will next be described, with reference to FIGS. 2 and 3.

As FIG. 3A shows, the photosensing circuit LS1 have a photosensing section Ls and an ambient light photosensor reading section Re1, and are so structured that the photosensing section Ls and the ambient light photosensor reading section Re1 are connected via a switching element S2.

The photosensing section Ls has a structure such that a capacitor Cw is connected between the TFT ambient light photosensor Ts's drain electrode D and source electrode S, the source electrode S and one of the capacitor Cw's terminals are connected via a switching element S1 to a first reference voltage source Vs, and the drain electrode D and the other of the capacitor Cw's terminals are connected to a second reference voltage source Vref. This second reference voltage source Vref is a DC voltage supply source that supplies a constant DC voltage. Also, the gate electrode G is connected to a bias voltage supply source that applies thereto a particular bias voltage GV. The output of the photosensing section Ls is drawn out through the source electrode S, which is one of the terminals of the capacitor Cw.

The ambient light photosensor reading section Re1 is made up of a capacitor Cr that accumulates the electrical charge of the photosensing section Ls's capacitor Cw, and a comparator CP, in the form of the first comparative circuit, that compares the voltage output from the capacitor Cr with a third reference voltage (threshold voltage) Vth. The photosensing section Ls and the ambient light photosensor reading section Re1 are connected via the second switching element S2.

The first and second switching elements S1, S2 are controlled by a switch controller SWC to turn on/off with a predetermined timing. The second switching element S2 constitutes a noise avoidance unit, as will be described hereafter.

As FIG. 2A shows, the TFT ambient light photosensor Ts and the first switching element S1 are both constituted of TFTs and are formed on the TFT substrate 2. On the TFT substrate 2 there are also formed the TFT ambient light photosensor Ts's gate electrode G, one terminal $C_1$ of the capacitor Cw, and a TFT gate electrode Gs constituting one of the first switching element S1's electrodes. Covering the surfaces of these there is laid a gate insulator 3 constituted of silicon nitride, silicon oxide or the like. Over the TFT ambient light photosensor Ts's gate electrode G and over the TFT gate electrode Gs that is a component of the first switching element S1, there are formed respectively, with the gate insulator 3 interposed, semiconductor layers $4_L$ and $4_S$ constituted of amorphous silicon, polycrystal silicon or the like. Also, the TFT ambient light photosensor Ts's source electrode S and drain electrode D, constituted of aluminum, molybdenum or the like metal, and a TFT source electrode $S_S$ and drain electrode $D_S$ that are components of the first switching element S1, are provided over the gate insulator 3 so as to contact with the semiconductor layers $4_L$ and $4_S$ respectively. Among these electrodes, the TFT ambient light photosensor Ts's source electrode S and the TFT drain electrode Ds that is a component of the first switching element S1 are extended towards and connected to each other so as to form the other terminal C2 of the capacitor Cw. Further, a protective insulator 5 constituted of, for example, a transparent inorganic insulative material, is laid so as to cover the surfaces of the TFT ambient light photosensor Ts, the capacitor Cw, and the first switching element S1, which is constituted of TFTs. Also, the top surface of the first switching element S1's semiconductor layer $4_S$ is covered by a light-blocking layer 6 constituted of black matrixes or the like. The TFT ambient light photosensor Ts and the TFTs of the first switching element S1 are formed simultaneously with the TFTs that serve as the switching elements for liquid crystal drive, during the process of manufacturing the liquid crystal panel. Consequently there is no need to increase the number of manufacturing processes in order to provide the photosensing section $L_S$.

Also, as shown in FIGS. 1, 2B and 3A, a wire is drawn out from the first switching element S1 of the photosensing section Ls and is connected to the terminal T4, which is connected to the first reference voltage source $V_S$ provided external to the liquid crystal display panel. Also, an output wire $L_2$ is drawn out from the source electrode S of the photosensing section Ls and is connected to the terminal T2, which is connected via the second switching element S2 provided external to the liquid crystal display panel, to the ambient light photosensor reading section Re1. Further, a wire is drawn out from the gate electrode G of the photosensing section Ls and is connected to the terminal T3, which is connected to the bias voltage supply source. Additionally, a power wire $L_1$ is drawn out from the drain electrode D and is connected to the terminal T1, which is connected to the second reference voltage Vref provided external to the liquid crystal display panel. The power wire $L_1$ is formed from the same material as that of the TFT gate electrodes which serve as the liquid crystal display panel's switching elements. Moreover, the output wire $L_2$ is formed from the same material as that of the source electrode. Consequently, these wires $L_1$ and $L_2$ can be formed simultaneously with the process of forming the source wires $SW_1$ to $SW_m$ and gate wires $GW_1$ to $GW_n$, and thus can be formed in a simple manner without increasing the number of processes. Also, if the power wire $L_1$ and output wire $L_2$ are laid with the gate insulator 3 interposed therebetween, a large capacitor Cw will be possible, as shown in FIG. 2B. Furthermore, if the wires that are connected to the terminals T3 and T4 are formed from the same materials as the source wires or gate wires as appropriate, it will be possible to form such wires without increasing the number of manufacturing processes.

The operation of the photosensing circuit LS1 will next be described, with reference to FIG. 3.

When the liquid crystal display device 1 is operating, a voltage VCOM constituted of rectangular waves is applied to the common electrode Vcom. Meanwhile, a bias voltage GV, more precisely a constant negative voltage (for example, −10 V), is applied from the bias voltage supply source to the gate electrode G of the TFT ambient light photosensor Ts, and a constant DC voltage (for example, 0 V) is applied from the second reference voltage source Vref to the drain electrode D. In this state, first of all the first switching element S1 is turned on for a predetermined duration (see FIG. 3B) and a predetermined voltage (for example, +2 V) is applied from the first reference voltage source Vs to the capacitor Cw, charging the capacitor Cw to a predetermined charge. When, with this state, ambient light shines on the TFT ambient light photosensor Ts, leakage current flows in the TFT ambient light photosensor Ts and part of the capacitor Cw's charging voltage is discharged. The amount of the discharge increases with time according to the ambient brightness. More precisely, the charging voltage is discharged and decreases with time according to the brightness (see T2 in FIG. 3B).

Meanwhile, in the photosensing section $L_S$ there are formed parasitic capacitances Cvs and Cvd between the source electrode S and drain electrode D on the one hand and the common electrode Vcom on the other (see FIGS. 2B and 3A), as well as parasitic capacitances Cs and Cd between the source electrode S and drain electrode D on the one hand and the gate electrode G on the other (see FIG. 3A). The VCOM voltage constituted of rectangular waves and indicated as VCOM in FIG. 3B is already applied to the common electrode Vcom, so that when such parasitic capacitances arise, short pulses accompanying the changes in the VCOM voltage occur in the output of the TFT ambient light photosensor Ts. More precisely, positive short pulses $N_1$ occur when the VCOM voltage steps up to the high level H, and negative short pulses $N_2$ when the VCOM voltage steps down to the low level L. These short pulses occur when the VCOM voltage changes. Therefore, if the second switching element S2 are turned on in synchrony with the pulse occurrence time points, then for example, the VCOM voltage would, upon stepping down to the low level for example, be lower than the third reference voltage, that is, the threshold voltage (Vth), and consequently the comparator CP's output would be inverted and the backlight would be lighted erroneously due to such output. Similar erroneous lighting would also occur when the VCOM voltage stepped up to the high level.

Figure 8A:
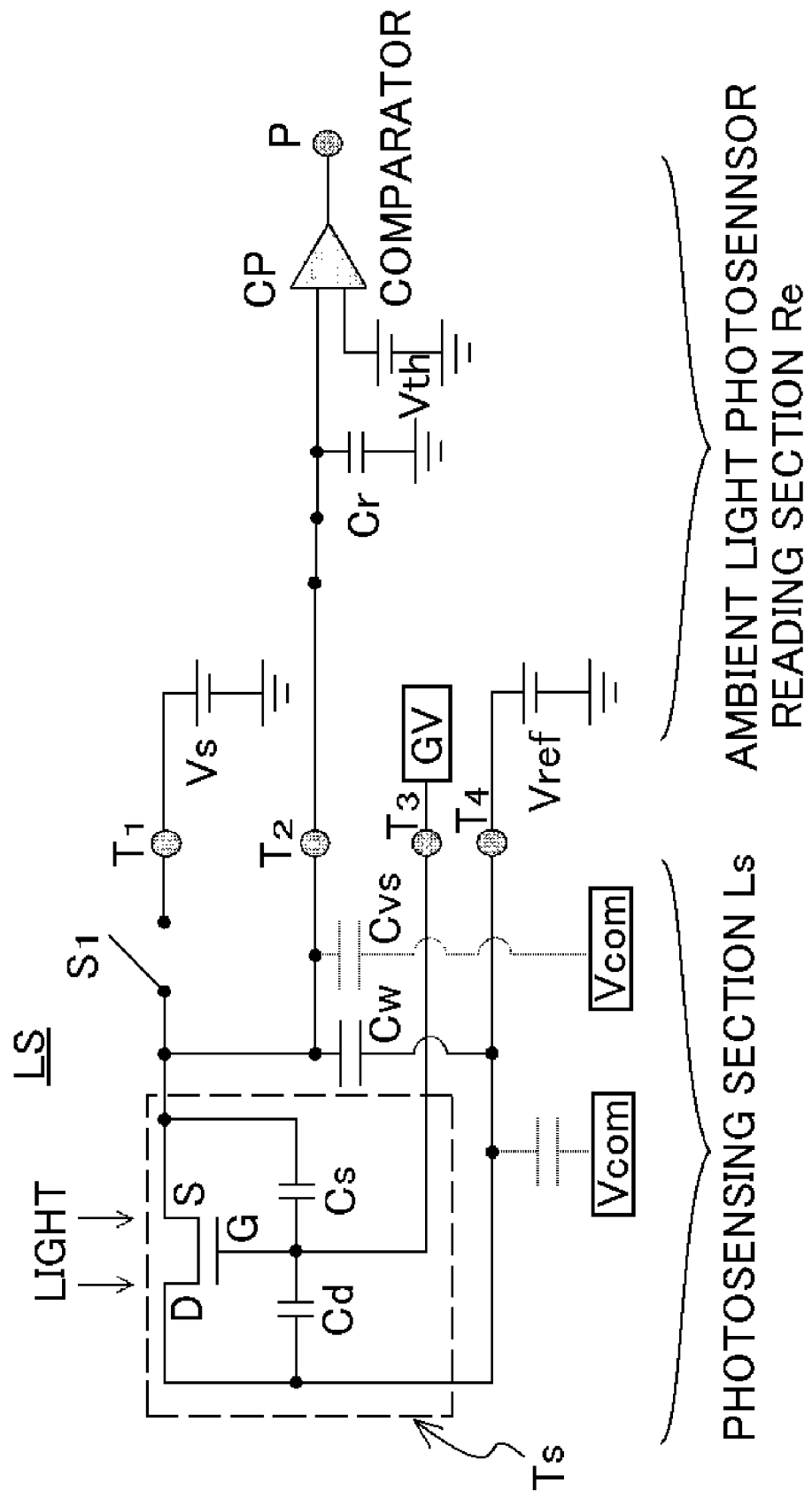
FIG. 8 illustrates a related-art photosensing circuit and an operational waveform diagram thereof.
Figure 8B:
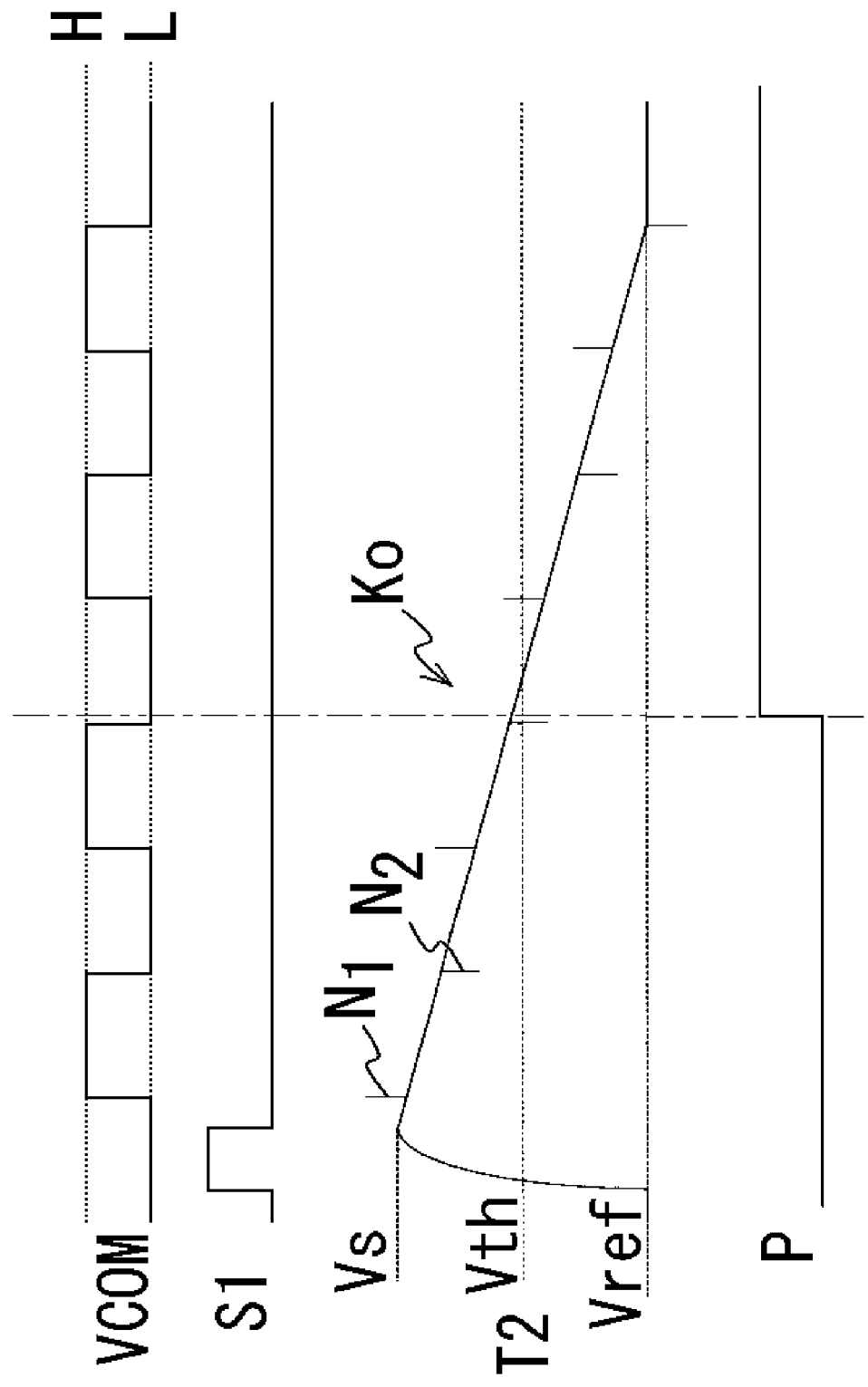

Such erroneous output and erroneous lighting are problems in the related art shown in FIG. 8 (dot-dash line $K_0$ in FIG. 8B). Accordingly, in order to eliminate such misoperation in the photosensing circuits LS1, for reading of the sensor output by the ambient light photosensor reading section Re1 the second switching element S2 is turned on when the VCOM voltage is not generating noise, more precisely, at a timing that matches the steady periods that exclude the time points when the VCOM voltage changes, that is, steps up and steps down. Specifically, by means of the switch controller SWC the second switching element S2 is turned on during the VCOML periods when the VCOM voltage is at the low level L (see FIG. 3B), and the capacitor Cw's voltage at such times is read by the ambient light photosensor reading section Re1; if the capacitor Cw's voltage is at or below the threshold voltage (Vth), the output of the comparator CP is inverted, and lighting of the backlight is controlled according to such inverted output P. Thanks to the second switching element S2 turning on with such timing, the effects of the negative short pulses $N_2$ when the VCOM voltage steps down to the low level L disappear and accurate ambient light sensing is enabled, with the result that erroneous lighting of the backlight is eliminated (see dot-dash line $K_1$ in FIG. 3B). In the foregoing the second switching element S2 is turned on in synchrony with the VCOML periods, but by virtue of the relationship with the threshold voltage value, the second switching element S2 may alternatively be turned on in synchrony with the VCOMH periods. Thus, by turning the second switching element S2 on during the steady periods that exclude the time points when the VCOM voltage changes—specifically, changes to the low level L or high level H—the effects of the short pulses $N_1$ and $N_2$ can be eliminated. With the foregoing structure, the second switching element S2 constitutes a noise avoidance unit that avoids the effects, that is, noise, of the short pulses $N_1$ and $N_2$.

The parasitic capacitances Cvs and Cvd arise due to the incorporation of the photosensing section Ls in the liquid crystal display panel, and are determined by the circuit design for such incorporation. This means that the values of such capacitances may be markedly large. If the values of the parasitic capacitances Cvs and Cvd are markedly large, it may not be possible to eliminate the effects of the short pulses $N_1$, $N_2$ only by turning the second switching element S2 on with the foregoing timing.

FIG. 4 is an operational waveform diagram for the case where parasitic capacitance is large in the photosensing circuit of FIG. 3A. Noise avoidance which takes account of the foregoing points for the case where parasitic capacitance is large, will now be described with reference to FIG. 4. If the parasitic capacitances Cvs and Cvd are markedly large, the amount of electrical charge that is accumulated in such parasitic capacitances Cvs and Cvd will be large, and due to such large electrical charge, the voltage of the capacitor Cw will fluctuate markedly. More precisely, the first standard reference voltage Vs to which the capacitor Cw is charged will vary into voltages Vs' that are increased or decreased by ΔVs depending on the charge amount. Consequently, the voltages Vs' will also be superimposed on the short pulses $N_1$, $N_2$, resulting in values ΔVs+Vs at the time points when the VCOM voltage changes, that is, steps up and steps down, and it will not be possible to achieve accurate ambient light sensing only by turning the second switching element S2 on during the periods when the VCOM voltage is steady. What is required therefore is to have the output of the TFT ambient light photosensor Ts output during the VCOML periods. To achieve this, firstly the first switching element S1 is turned on during the VCOML periods, charging the capacitor Cw with the first reference voltage Vs, then the second switching element S2 is likewise turned on during the VCOML periods, so that the photosensing section Ls is connected to and read by the ambient light photosensor reading section Re1 (see $K_2$ in FIG. 4).

To have the output of the TFT ambient light photosensor Ts output during the VCOMH periods, firstly the first switching element S1 is turned on during the VCOMH periods, charging the capacitor Cw with the first reference voltage Vs, then the second switching element S2 is likewise turned on during the VCOMH periods, so that the photosensing section Ls is connected to and the output thereof read by the ambient light photosensor reading section Re1. Thereby, accurate ambient light sensing is enabled even if the parasitic capacitance is markedly large and the voltage of the capacitor Cw fluctuates under the influence thereof. The foregoing control of the second switching element S2 will be performed by the switch controller SWC.

Second Embodiment

Figure 5A:
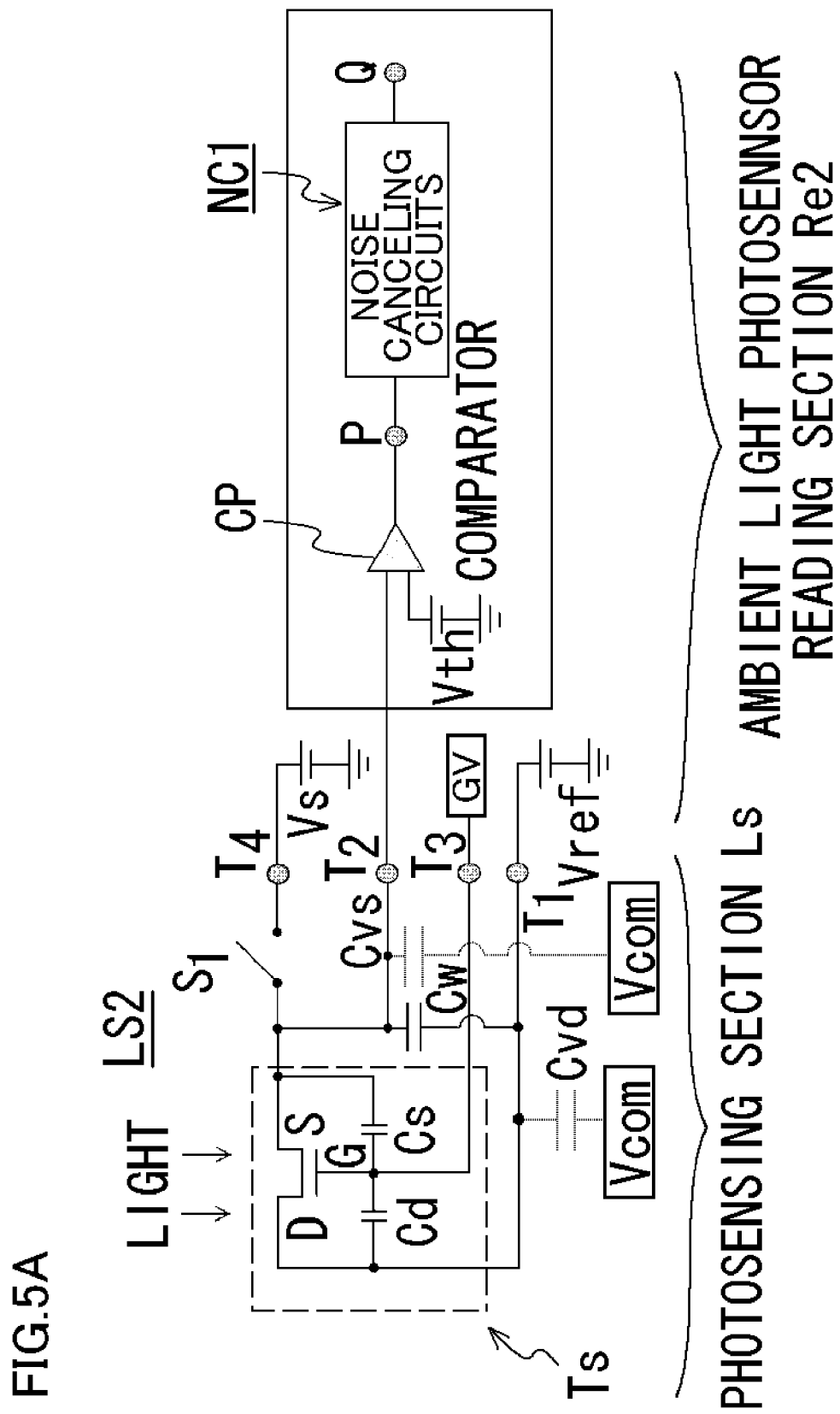
FIG. 5 illustrates a photosensing circuit installed in a liquid crystal display device of a second embodiment of the invention.
Figure 5B:
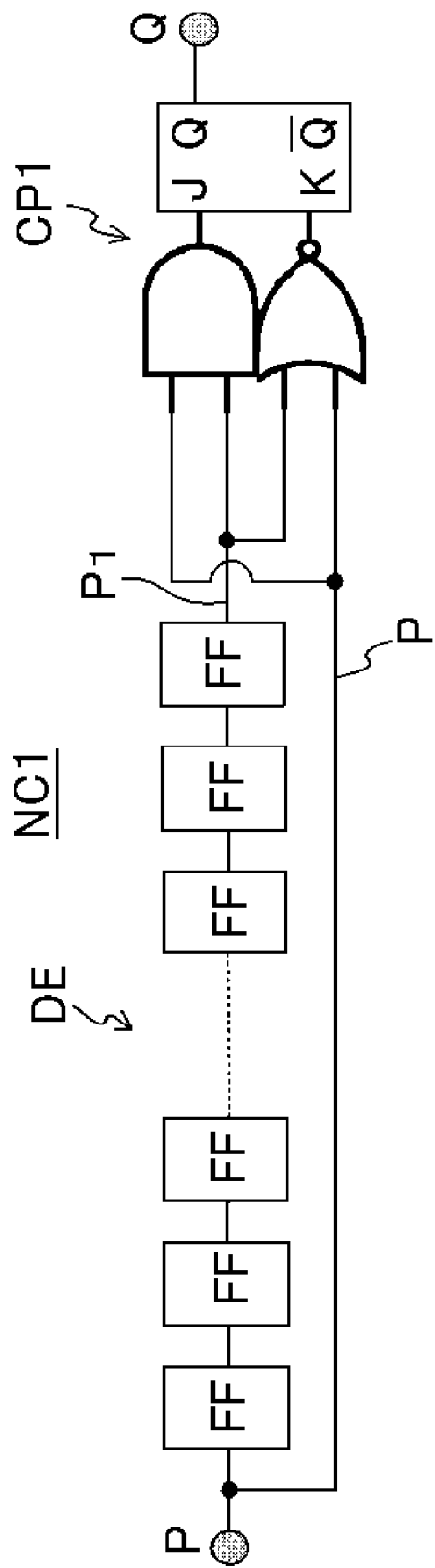
Figure 5C:
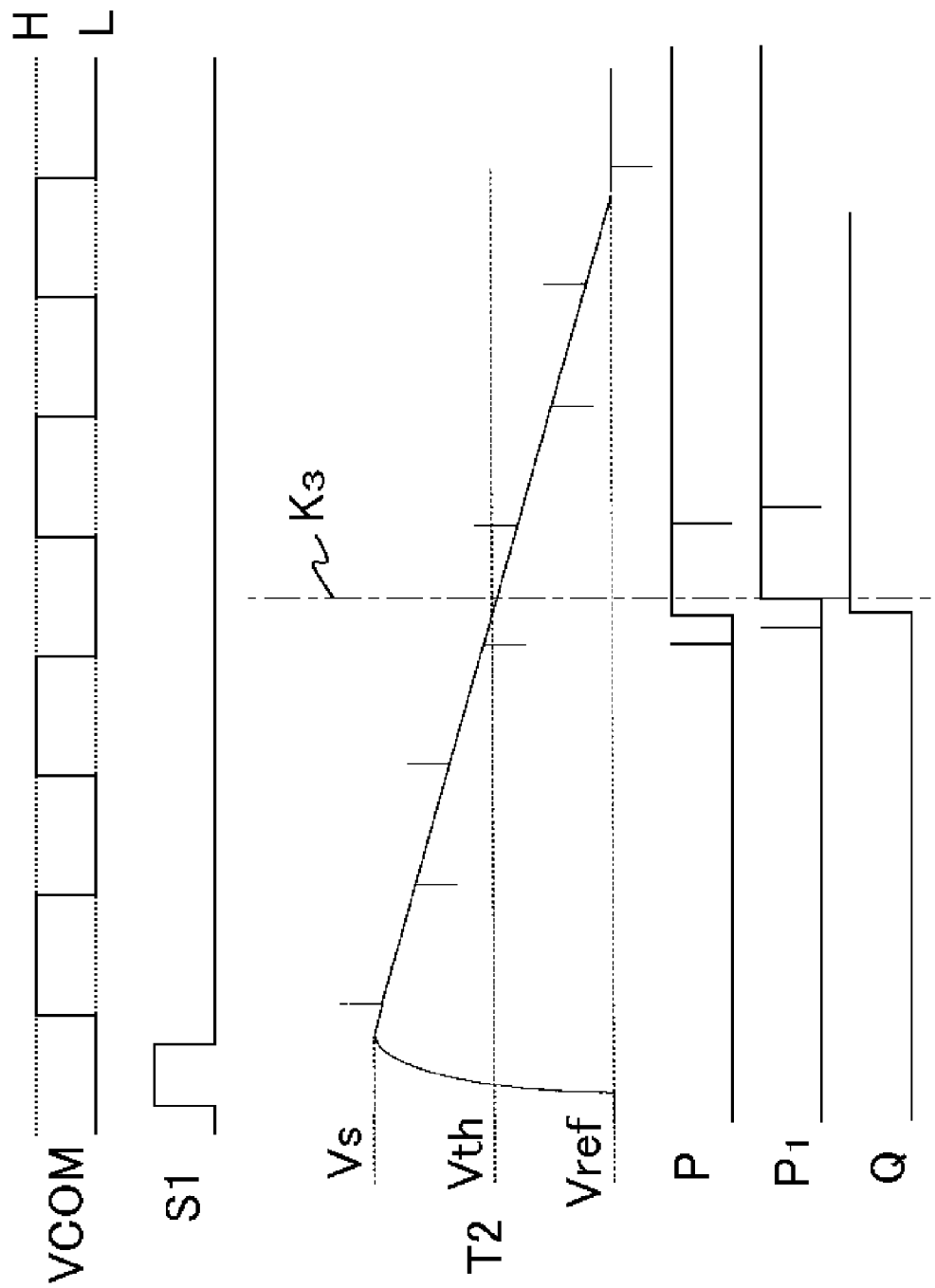
Figure 6A:
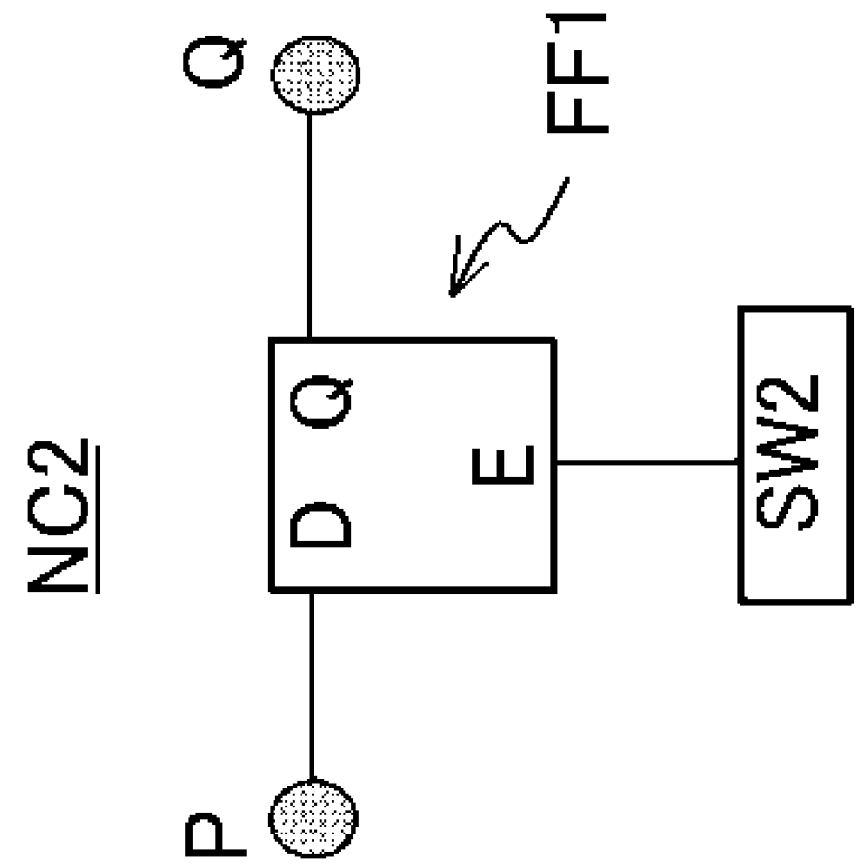
FIG. 6 illustrates a variant of a noise canceling circuit shown in FIG. 5.

FIG. 5 illustrates a photosensing circuit installed in a liquid crystal display device of a second embodiment of the invention, FIG. 5A being a photosensing circuit diagram, FIG. 5B being a diagram of a noise canceling circuit used in the photosensing circuit in FIG. 6A, and FIG. 5C being an operational waveform diagram of the circuit in FIG. 6A.

The photosensing circuit LS2 has the photosensing section Ls and an ambient light photosensor reading section Re2 that reads the output thereof, and are so structured that a noise canceling circuit NC1 is provided in the ambient light photosensor reading section Re2. The photosensing section Ls and the comparator CP of the ambient light photosensor reading section Re2 in the photosensing circuit LS2 are the same as the items in the photosensing circuit LS1 described above. To avoid duplication therefore, such elements that are in common with the photosensing circuit LS1 will be assigned the identical reference numerals and descriptions thereof will be omitted below, only the elements that differ from those in the photosensing circuit LS1 being described.

The noise canceling circuit NC1 of the photosensing circuit LS2 in this embodiment has a delaying circuit DE into which the output P of the comparator CP constituting the first comparative circuit is input, and which delays such output P by a predetermined duration, and a second comparative circuit CP1 that compares an output $P_1$ of the delaying circuit DE with the output P of the comparator CP. The delaying circuit DE is a serial circuit constituted of multiple flip-flops FF connected in series, while the second comparative circuit CP1 is constituted of a logic circuit and JK flip-flop.

The operation of the noise canceling circuit NC1 is as follows. The photosensing section Ls's output, which includes short pulses, is input to the comparator CP, then the output P is sent out from the comparator CP, is input to the delaying circuit DE and second comparative circuit CP1, and emerges as the output $P_1$ that is delayed by a predetermined duration, having passed through the delaying circuit DE. The outputs P and $P_1$ are compared by the second comparative circuit CP1, and an output Q is sent out from the second comparative circuit CP1 (see K3 in FIG. 5C). Thus, the noise canceling circuit is able to compare the outputs P and $P_1$ and outputs an optimum output Q, thanks to which, the noise due to the variation in VCOM is eliminated.

Although the delaying circuit and comparative circuit are used for the photosensing section LS2's noise canceling circuit NC1 in the foregoing description, enabling flip-flops could be used instead.

FIG. 6 illustrates a variant of the noise canceling circuit in FIG. 5, FIG. 6A being a noise canceling circuit diagram and FIG. 6B being an operational waveform diagram of the circuit in FIG. 6A.

These noise canceling circuit NC2 uses an enabling flip-flop FF1 instead of the delaying circuit DE and comparative circuit CP1 making up the noise canceling circuit NC1, and are so structured that the flip flop FF1 is connected to the comparator CP. The operation of the noise canceling circuit NC2 is as follows. A signal that turns on the second switching element S2 is sent out from the controller SWC of the photosensing circuit LS1 and is applied to the flip-flop FF1 as an enabling signal, activating the flip-flop FF1. Thereby, even if short pulses are superimposed on the output of the photosensing section Ls, more specifically, on the output P of the comparator CP, the short pulse noise can be eliminated by activating the flip-flop FF1 with the same signal from the controller SWC as the signal that turns on the second switch S2.

Third Embodiment

Figure 7A:
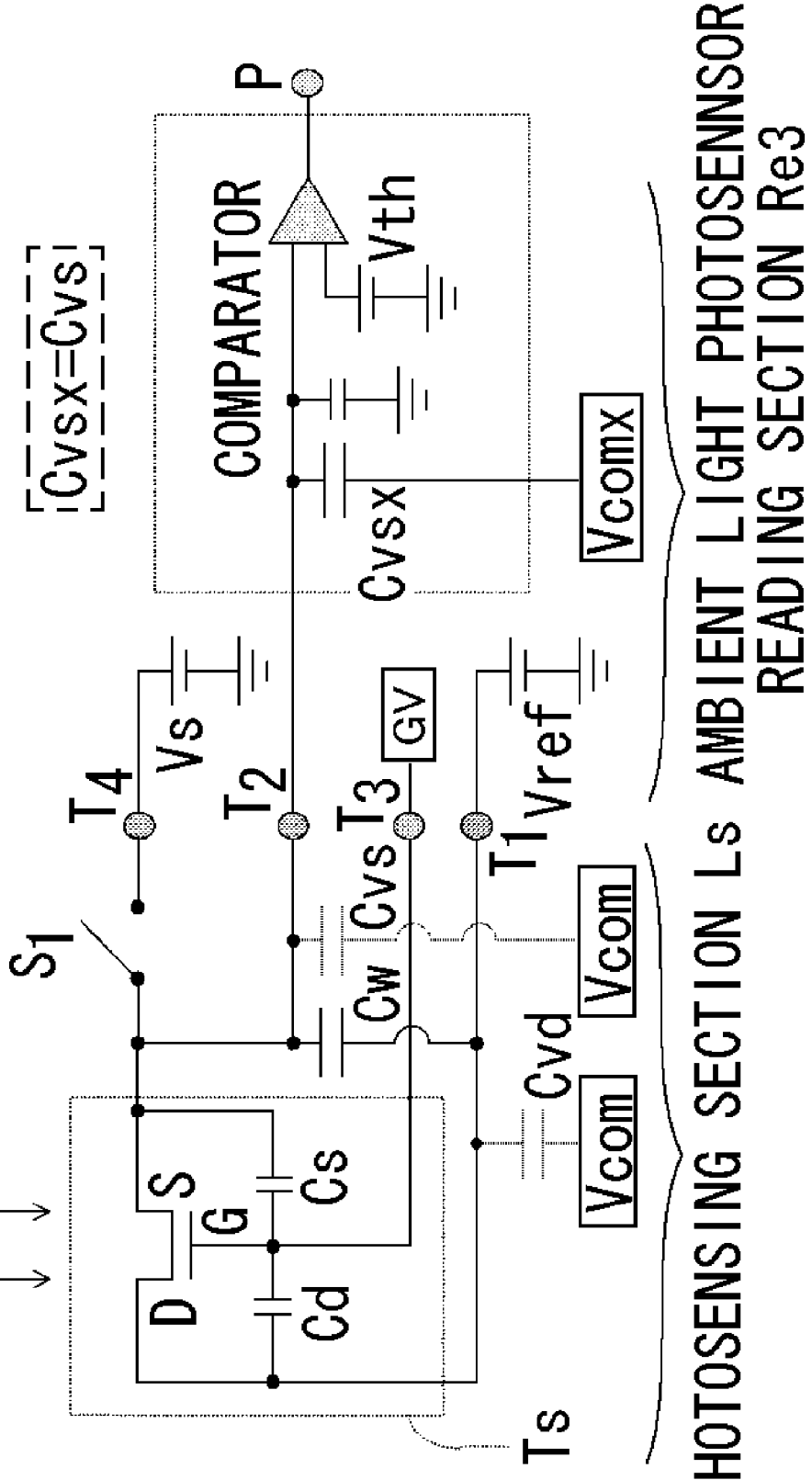
FIG. 7 illustrates a photosensing circuit installed in a liquid crystal display device of a third embodiment of the invention.
Figure 7B:
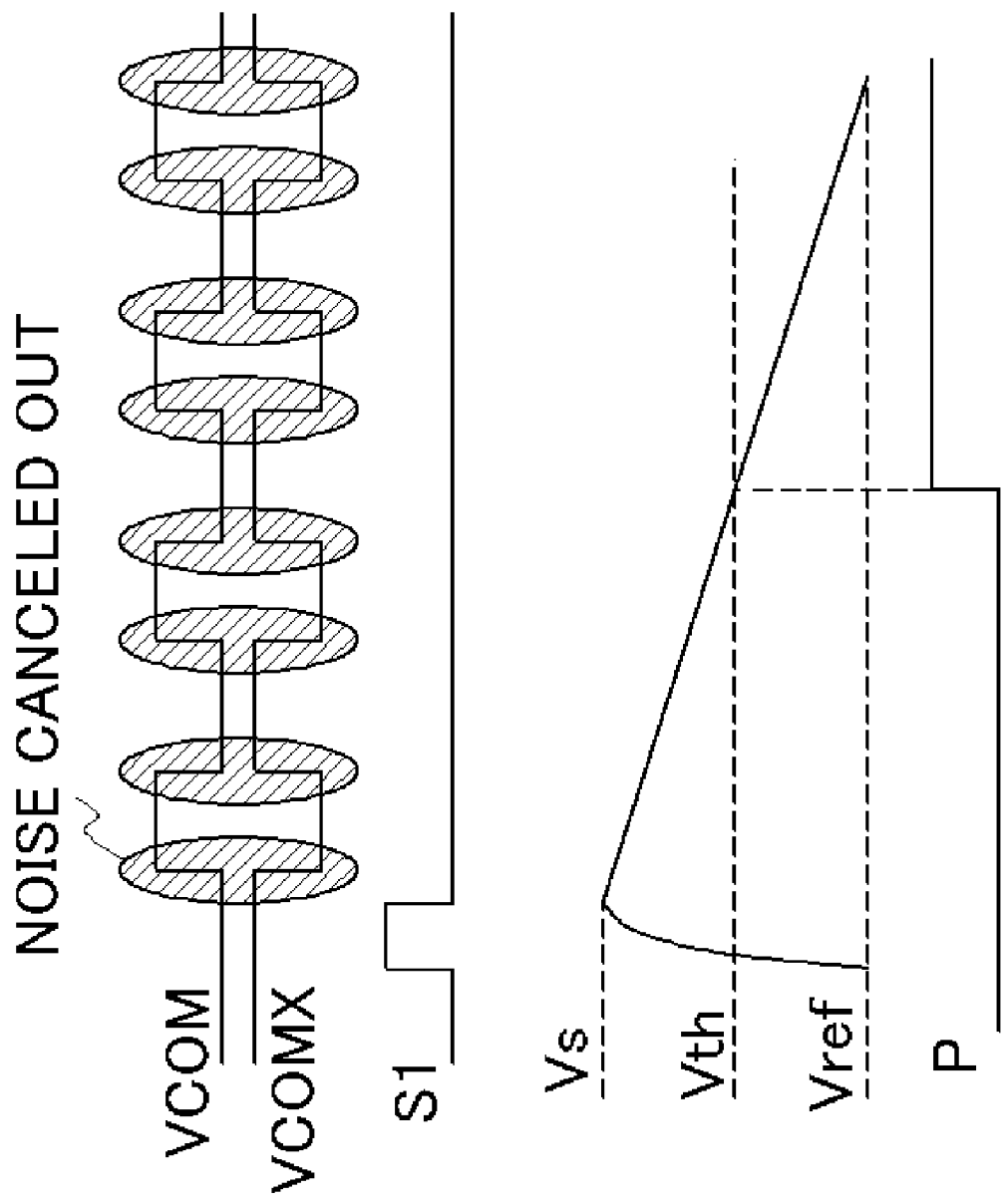

FIG. 7 illustrates a photosensing circuit installed in a liquid crystal display device of a third embodiment of the invention, FIG. 7A being a photosensing circuit diagram and FIG. 7B an operational waveform diagram of the photosensing circuit in FIG. 7A.

The photosensing circuit LS3 has a photosensing section Ls and an ambient light photosensor reading section Re3, and are so structured that one end of a capacitor Cvsx with the same capacitance as the parasitic capacitance Cvs is connected to the output end of the photosensing section Ls, and the other end is connected to a voltage source Vcomx of opposite phase to the Vcom voltage. The capacitance of this capacitor Cvsx is set to the same or roughly the same value as the parasitic capacitance Cvs between the source electrode S and the common electrode Vcom, and is determined and incorporated during circuit design.

The operation of the photosensing circuit LS3 is as follows. A common signal, more precisely a signal Vcomx of opposite phase to Vcom, is formed in the Vcomx voltage source and is applied to the capacitor Cvsx connected to the output end of the photosensing section Ls. Because the VCOM voltage constituted of rectangular waves and indicated as VCOM in FIG. 3B is already applied, application of the opposite-phase signal Vcomx results in short pulses arising in the output of the TFT ambient light photosensor Ts when the VCOM voltage changes, or more precisely, in positive short pulses $N_1$ when the VCOM voltage steps up to the high level H, and in negative short pulses $N_2$ when the VCOM voltage steps down to the low level L. Because these short pulses occur when the VCOM voltage changes, turning on the second switching element S2 in synchrony with the time points at which the short pulses occur will make Vcomx step down when the capacitor Cw's voltage is stepped up by the short pulses, and step up when the capacitor Cw's voltage is stepped down by the short pulses, so that the noise is canceled out. Hence, the noise is eliminated, as is erroneous sensing by the ambient light photosensor.

The present invention has been described in detail above through the foregoing embodiments. It will be understood however that the invention is not limited to these, and that modifications and variations thereof could be carried out by those with an ordinary level of skill in the technical field to which the invention belongs, without departing from the concepts and spirit thereof. For instance, besides being a liquid crystal display device, the display device could be any generally known display device. Also, another ambient light photosensor such as a photodiode could be used instead of a thin film transistor. Further, the actuation circuits for the TFT ambient light photosensor are not limited to items such as illustrated in FIG. 3, but might alternatively be, for example, circuits such that the source electrode is connected to a first drive voltage source, the gate electrode and capacitor are each connected to a second drive voltage source, and the capacitor is charged with the photoelectric current output by the TFT ambient light photosensor.

What is claimed is:

1. A display device comprising:
    a display panel;
    a drive circuit that drives the display panel;
    an illuminating unit that illuminates the display panel;
    a photosensing section that is incorporated into the display panel and has an ambient light photosensor that senses the brightness of ambient light and a capacitor that is charged with a predetermined reference voltage via a first switch,
    an ambient light photosensor reading section that reads a value sensed by the photosensing section, and
    a controller that controls the illuminating unit according to an output of the ambient light photosensor reading section;
    the ambient light photosensor reading section being provided with a noise avoidance unit that avoids erroneous sensing in the photosensing section induced as a result of noise generated when the drive circuits operate.

2. The display device according to claim 1, wherein the noise avoidance unit includes a second switch that connects the photosensing section to the ambient light photosensor reading section, and a switch controller that controls the second switch, and the switch controller performs control so that the second switch is turned on when the drive circuit is generating no noise.

3. The display device according to claim 2, wherein a low level signal and a high level signal are applied alternately in a predetermined cycle to an electrode of the display panel, and the switch controller performs control so that when the low level signal is applied, the first switch is turned on and, if the capacitor is charged to the reference voltage, the second switch is turned on during application of the low level signal; and when the high level signal is applied, the first switch is turned on and, if the capacitor is charged to the reference voltage, the second switch is turned on during application of the high level signal.

4. A display device comprising:
    a display panel;
    a drive circuit that drives the display panel;
    an illuminating unit that illuminates the display panel;
    a photosensing section that is incorporated into the display panel and has an ambient light photosensor that senses the brightness of ambient light and a capacitor that is charged with a predetermined reference voltage via a first switch,
    an ambient light photosensor reading section that reads a value sensed by the photosensing section, and
    a controller that controls the illuminating unit according to an output of the ambient light photosensor reading section;
    the ambient light photosensor reading section including a first comparative circuit that compares the photosensing section's output with a predetermined reference value and outputs a predetermined digital signal, and a noise canceling circuit that receives the digital signal from the first comparative circuit and, if such digital signal varies in a time period shorter than a predetermined time period, judges such digital signal to be noise and excludes such digital signal.

5. The display device according to claim 4, wherein the noise canceling circuit is provided with a delaying circuit that delays by a predetermined time period the digital signal from the first comparative circuit, and with a second comparative circuit that compares the delayed digital signal from the delaying circuit with the undelayed digital signal from the first comparative circuit, and the second comparative circuit produces output when the delayed and undelayed digital signals coincide.

6. The display device according to claim 4, wherein the noise canceling circuit includes an enabling circuit that generates an enabling signal when the drive circuit is generating no noise, and the noise canceling circuit produces output while detecting such enabling signal.

7. A display device comprising:

a display panel;

a drive circuit that drives the display panel;

an illuminating unit that illuminates the display panel;

a photosensing section that is incorporated into the display panel and has an ambient light photosensor that senses the brightness of ambient light and a capacitor that is charged with a predetermined reference voltage via a first switch, an ambient light photosensor reading section that reads a value sensed by the photosensing section, and a controller that controls the illuminating unit according to an output of the ambient light photosensor reading section;

the ambient light photosensor reading section being provided with a capacitor having the same capacitance as a parasitic capacitance formed between an output wire of the photosensing section and an electrode of the display panel, and a signal of opposite phase to a signal applied to the electrode being applied to the capacitor.

* * * * *